B. R. HAWLEY & A. R. MORGAN.
Improvement in Process of Treating Peat.
No. 127,415. Patented June 4, 1872.

UNITED STATES PATENT OFFICE.

BENJAMIN R. HAWLEY, OF NORMAL, ILLINOIS, AND ALONZO R. MORGAN, OF NEW YORK, N. Y.

IMPROVEMENT IN PROCESSES OF TREATING PEAT.

Specification forming part of Letters Patent No. 127,415, dated June 4, 1872.

Specification describing an Improved Process for Drying Peat in the preparation of it for fuel, invented by BENJAMIN R. HAWLEY, of Normal, Illinois, and ALONZO R. MORGAN, of New York city, and State of New York.

Our said invention relates to an improved manner of treating peat in a wet state to dry and prepare it for fuel; and it consists in the application of the heat to the top of the mass to be dried, and forcing it downward through said mass, the same being placed on an elevated open or perforated bed or floor of any kind, with ample space underneath for the escape of the hot air used, said floor being in a closed dry-house or chamber of any kind, arranged to receive the heated air above the peat, and provided with means to cause the heat to fall or settle down through the peat and escape through the floor and passages, say a draught-chimney, fan, or other means competent to produce the desired effect.

Figure 1:
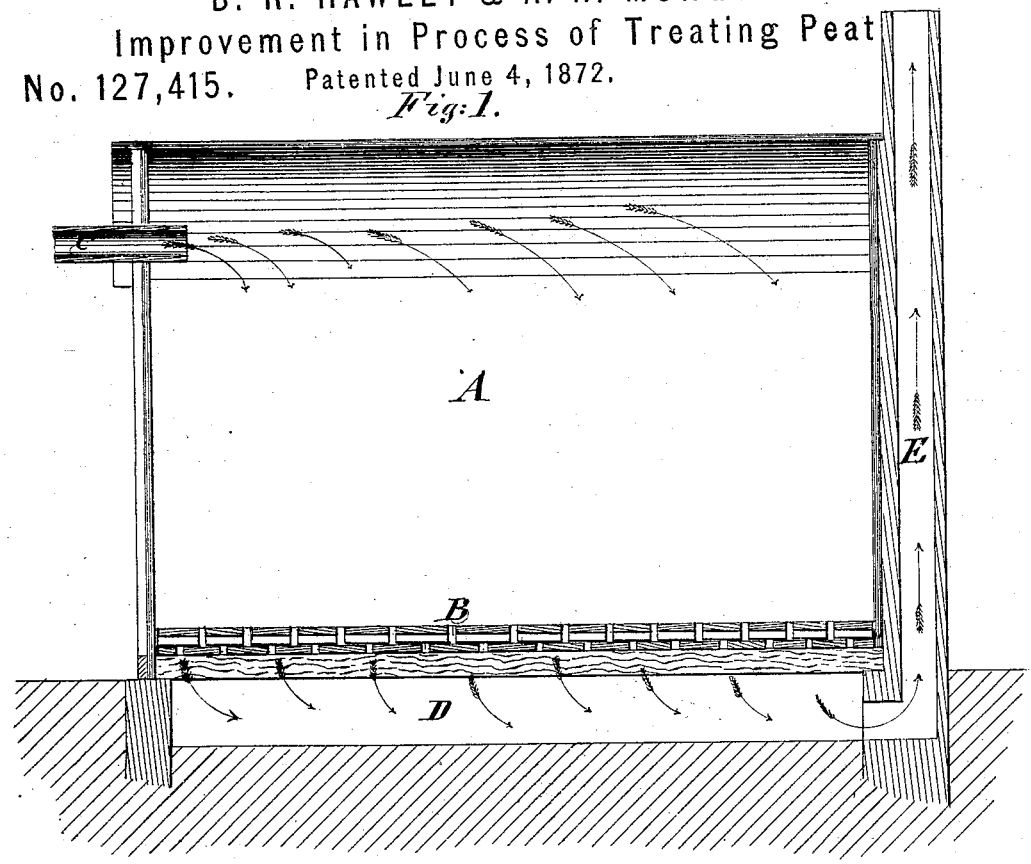
Figure 2:
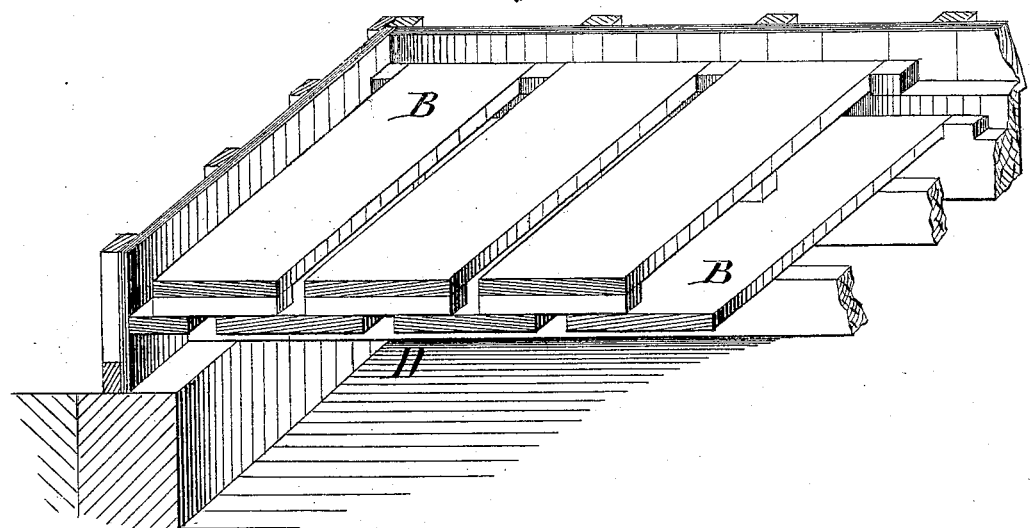

Figure 1 in the accompanying drawing is a sectional elevation of apparatus that may be successfully used to carry out our invention; and Fig. 2 is a horizontal section of the same in perspective—

A being an inclosed chamber, with a floor with openings to allow of the escape of the heated air while supporting the mass to be dried above it. C is the inlet-pipe for the admission of the heated air; D, a passage below the floor; and E, a chimney for drawing the air from any suitable heater into the chamber, and down through the peat. Other equivalent apparatus may be used, as preferred or found best in practice.

We adopt this mode of treatment instead of the usual mode of applying the heat below because, first, when the heated air is caused to pass from above downward, contrary to its natural tendency, which is upward, it spreads out in a stratum to the walls of the chamber confining it, in all directions, by which the temperature is equalized over the whole area, so that there are no local differences in the action on the peat, as there are when the heat is applied below and passes upward; and, second, because, when applied to the top, the moisture thereat which is first reached and vaporized being liberated from the peat, and being heavier than the incoming heated or dry air, naturally tends downward by its gravity in advance of the drier portions behind, and is rapidly absorbed by the colder mass below, to which the heat also naturally tends, so that we have the two influences—viz., the gravity of the heated aqueous vapor, and the tendency of the heat above toward the cold mass below—acting together in the same direction—the one assisting or accelerating the other in such manner and to such extent as to accomplish the work more thoroughly and in much less time than when the heat is applied below, which we have thoroughly demonstrated practically.

When the heat is applied below an inevitable conflict of forces takes place, as the uprising heated air comes first in contact with the under surface of the material to be dried and liberates therefrom vapors, which upon continuing to rise enter the cooler material above and become condensed after, completely saturating the super-substance with moisture to such a degree as to cause them to drip back and dampen the substance below previously dried, thus retarding or totally defeating complete desiccation. These difficulties are entirely obviated when tne heat is applied from above downward, as above described.

We propose to employ this mode of applying the heat, also, when the peat is pressed into blocks or cakes, as it sometimes is before drying; but it is more especially adapted for drying the mass as it comes from the bed.

Experiments which we have made to test this process demonstrate that it possesses very great advantages, in economy of fuel and labor, over any other known plan calculated to render the production of peat-fuel pecuniarily successful, whereas, up to this time, it has not been successful mainly because of the very difficulty of drying it by the old mode, which we have pointed out, and which our plan overcomes.

We claim as our invention—

The process of drying peat by applying the heat at the top, and causing it to pass downward through the mass, substantially as specified.

B. R. HAWLEY.
A. R. MORGAN.

Witnesses to signature of B. R. HAWLEY:
G. L. HALL,
A. J. ARMSTRONG.

Witnesses to signature of A. R. MORGAN:
S. WOODARD,
EDWARD MADDOCK.